US006471243B1

(12) United States Patent
Brown

(10) Patent No.: US 6,471,243 B1
(45) Date of Patent: Oct. 29, 2002

(54) INFLATION MECHANISM FOR INFLATABLE SEAT BELT

(75) Inventor: Louis R. Brown, Oxford, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/657,072

(22) Filed: Sep. 7, 2000

(51) Int. Cl.⁷ .............................................. B60R 21/18
(52) U.S. Cl. ..................................... 280/733; 280/808
(58) Field of Search ................................ 280/733, 802, 280/807, 808

(56) References Cited

U.S. PATENT DOCUMENTS

| | | |
|---|---|---|
| 3,682,498 A | 8/1972 | Rutzki |
| 3,791,670 A | 2/1974 | Lucore et al. |
| 3,801,156 A | 4/1974 | Granig |
| 5,346,250 A | 9/1994 | Kamiyama |
| 5,466,002 A | 11/1995 | Tanaka et al. |
| 6,062,597 A | 5/2000 | Suyama |
| 6,170,863 B1 * | 1/2001 | Takeuchi et al. ............ 280/733 |

* cited by examiner

Primary Examiner—Paul N. Dickson
Assistant Examiner—Faye M. Fleming
(74) Attorney, Agent, or Firm—Tarolli, Sundheim, Covell, Tummino & Szabo L.L.P.

(57) ABSTRACT

An apparatus for helping to protect a vehicle occupant comprises a vehicle seat belt system (14) including a buckle (20), a tongue assembly (90), and an inflatable seat belt portion (12) connected with the tongue assembly. An inflation mechanism (10) connected with the buckle (20) includes an actuatable inflator (60) and a first conduit (70) in fluid communication with the inflator. A second conduit (110) is in fluid communication with the inflatable seat belt portion (12). The first conduit (70) has a rupturable portion (82) blocking fluid flow out of the first conduit toward the second conduit (110). The first conduit (70), upon actuation of the inflator (60), moves from a first position in which the first conduit is not in fluid communication with the second conduit (110) to a second position in which the first conduit is in fluid communication with the second conduit. The rupturable portion (82) is ruptured to enable fluid flow from the first conduit (70) to the second conduit (110) to inflate the inflatable seat belt portion (12). Means (58) for venting erroneously released inflation fluids are also provided.

19 Claims, 5 Drawing Sheets

INFLATION MECHANISM FOR INFLATABLE SEAT BELT

BACKGROUND OF THE INVENTION

1. Technical Field

The present invention relates to an inflation mechanism for an inflatable vehicle seat belt.

2. Description of the Prior Art

Inflatable seat belts are known. An inflatable seat belt is inflated by inflation fluid from an inflation fluid source. The inflation fluid is typically passed through one or more conduits to an inflatable portion of the seat belt to inflate the inflatable portion.

The seat belt is typically a part of a seat belt system that includes a tongue assembly engageable with a buckle. The prior art shows various mechanisms for passing inflation fluid through, or past, the connection between the tongue assembly and the buckle.

SUMMARY OF THE INVENTION

The present invention is an apparatus for helping to protect a vehicle occupant. The apparatus comprises a vehicle seat belt system including a buckle, a tongue assembly, and an inflatable seat belt portion connected with the tongue assembly. An inflation mechanism connected with the buckle includes an actuatable inflator and a first conduit in fluid communication with the inflator. A second conduit is in fluid communication with the inflatable seat belt portion. The first conduit has a rupturable portion blocking fluid flow out of the first conduit toward the second conduit. The first conduit, upon actuation of the inflator, moves from a first position in which the first conduit is not in fluid communication with the second conduit to a second position in which the first conduit is in fluid communication with the second conduit. The rupturable portion is ruptured to enable fluid flow from the first conduit to the second conduit to inflate the inflatable seat belt portion.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION OF AN EMBODIMENT OF THE INVENTION

Figure 1:
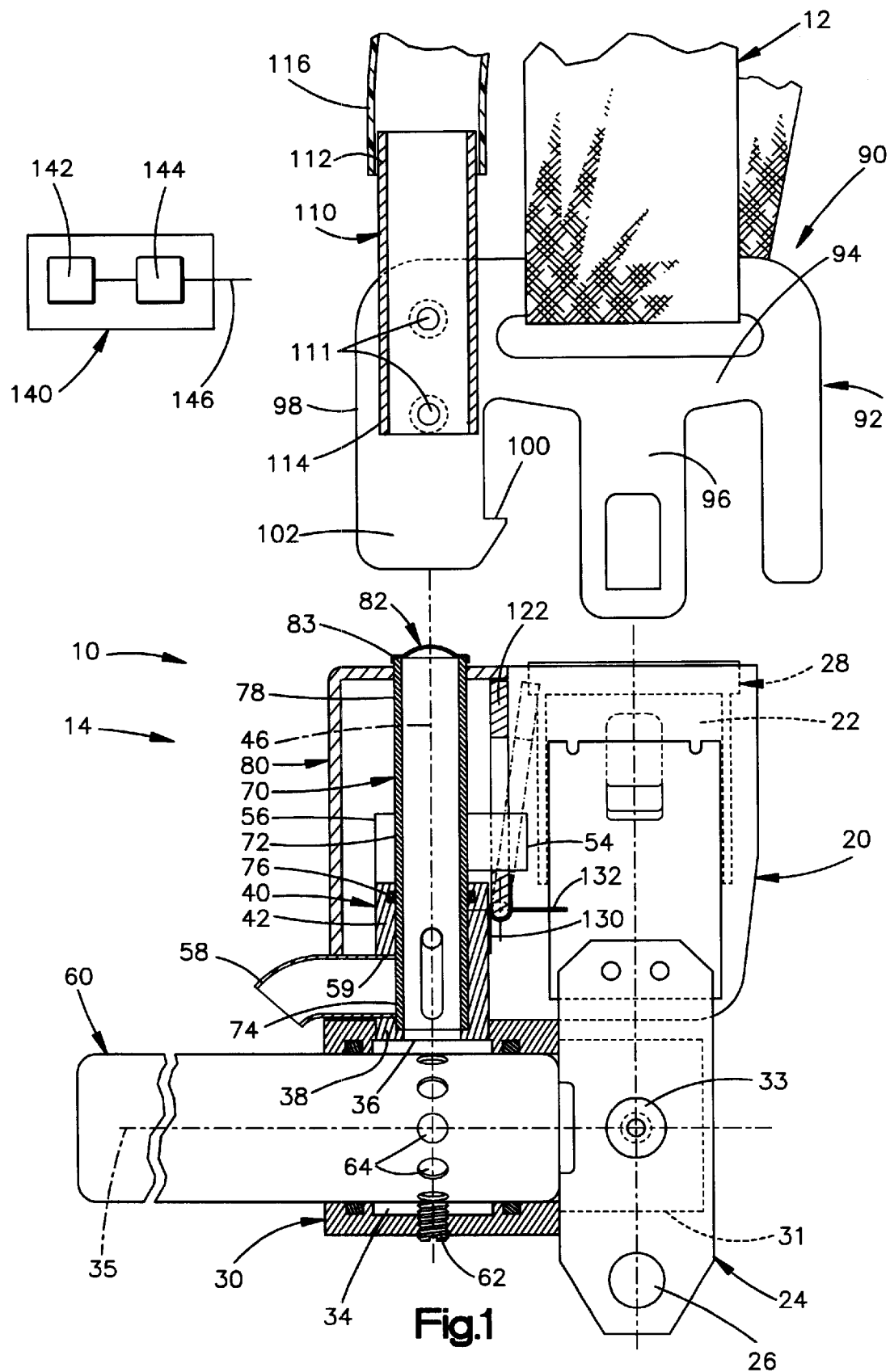
FIG. 1 is an elevational view, partially in section, of a seat belt inflation mechanism constructed in accordance with the present invention, as part of a seat belt system shown in an unbuckled condition.
Figure 2:
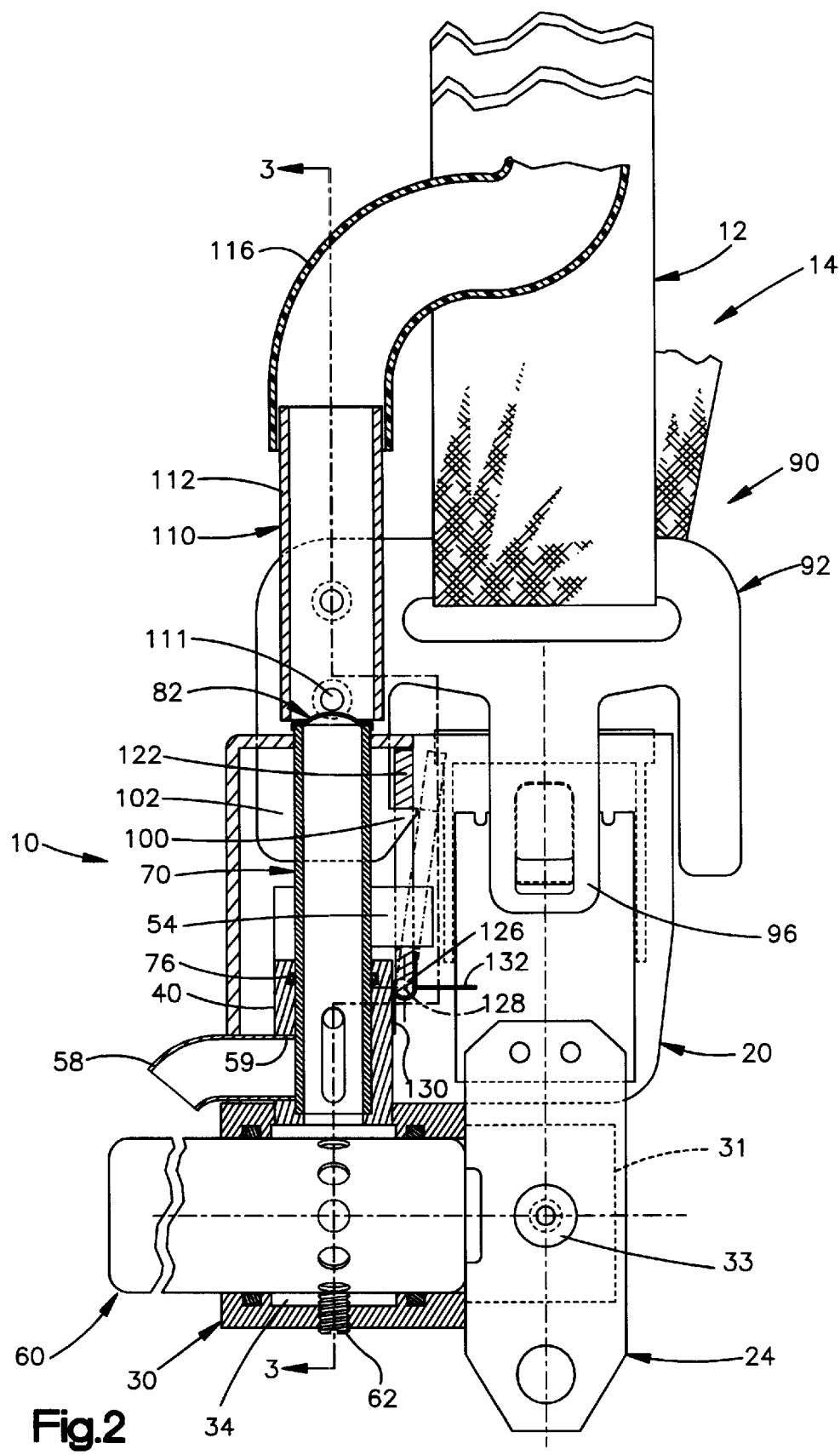
FIG. 2 is a view similar to FIG. 1, with the seat belt system shown in a buckled condition.

The present invention relates to an inflation mechanism for an inflatable seat belt. The present invention is applicable to various inflation mechanism constructions. As representative of the present invention, FIG. 1 illustrates a seat belt inflation mechanism 10 for an inflatable seat belt 12 (FIGS. 1 and 2). The inflatable seat belt 12 is part of a vehicle seat belt system 14 for use in helping to protect an occupant of a vehicle.

The seat belt system 14 includes a buckle 20 and a tongue assembly 90. The buckle 20 has an opening 22 for receiving a portion of the tongue assembly 90, in a manner described below. The buckle 20 is connected with an anchor plate 24. The anchor plate 24 has a fastener opening 26 for receiving a fastener (not shown), such as a bolt, to secure the anchor plate to the vehicle body. The anchor plate 24 when thus fastened to the vehicle body secures the buckle 20 to the vehicle body. The buckle 20 also includes a pushbutton 28 for manually releasing the tongue assembly 90 from the buckle.

The anchor plate 24, in addition to supporting the buckle 20, also supports the inflation mechanism 10. The inflation mechanism 10 includes a manifold 30. The manifold 30 has an anchor portion 31 that is secured to the anchor plate 24 by a rivet 33. The manifold 30 is thereby secured to the vehicle body, adjacent to the buckle 20. The manifold 30 has a tubular, cylindrical configuration centered on an axis 35 and defining an inflator chamber 34 in the manifold.

The inflator chamber 34 has an opening 36. An inner end portion 38 of a cylinder 40 is secured in the opening 36 and extends radially outward from the inflator chamber 34. The cylinder 40 has a side wall 42 centered on an axis 46. The interior of the cylinder 40 is in fluid communication, through the opening 36 in the manifold 30, with the inflator chamber 34 in the manifold.

A stop screw 50 (FIG. 3) is screwed into the side wall 42 of the cylinder 40. The stop screw 50 projects into the interior of the cylinder 40 from the side wall 42. The stop screw 50 secures a locking flange 52 to the manifold 30. An end portion 54 of the locking flange 52 projects from an upper end portion 56 of the locking flange and cylinder 40, in a direction away from the axis 46 (FIGS. 1 and 2).

A vent tube 58 extends through an opening 59 in the side wall 42 of the cylinder 40, near the manifold 30. The vent tube 58 establishes fluid communication between the ambient air around the inflation mechanism 10, the cylinder 40, and the inflator chamber 34 in the manifold 30.

The inflation mechanism 10 includes an inflation fluid source, or inflator, 60 secured in the manifold 30 with a set screw 62. The inflator 60 has a plurality of fluid outlets 64 located in the inflator chamber 34 in the manifold 30. The inflator 60 preferably contains a stored quantity of pressurized inflation fluid. The inflation mechanism 10 alternatively could include an inflator 60 that uses the combustion of gas-generating material to generate inflation fluid in the form of gas, or an inflator that contains a stored quantity of pressurized inflation fluid and an ignitable material for heating the inflation fluid.

The inflation mechanism 10 includes a first conduit 70. The first conduit 70 is a tubular member supported in the cylinder 40 for sliding movement in the cylinder. The first conduit 70 includes a wall 72 having a cylindrical configuration centered on the axis 46. An inner end portion 74 of the first conduit 70 is open, establishing fluid communication between the interior of the first conduit and the interior of the cylinder 40. A seal 76 in the cylinder 40 seals against the outer side surface of the first conduit 70.

An opposite outer end portion 78 of the first conduit 70 is enclosed or supported in a housing 80 secured to the manifold 30. The outer end portion 78 of the first conduit 70 is closed with a burst disk 82. The burst disk 82 is, preferably, coated with an elastomeric coating, a portion 83 of which projects radially outward of the wall 72 of the first conduit 70.

A slot 84 (FIG. 5) is located in the inner end portion 74 of the first conduit 70. The stop screw 50 projects into the slot 84. The engagement of the stop screw 50 in the slot 84 limits movement of the first conduit 70 in a direction away from the inflator 60, as described below.

The tongue assembly 90 (FIGS. 1 and 2) includes a latch plate 92. The latch plate 92 is preferably made from a single piece of metal and has a planar configuration including a base portion 94. A primary latch portion 96 of the latch plate 92 projects from the base portion 94. The primary latch portion 96 of the latch plate 92 is receivable in the opening 22 in the buckle 20, in a known manner, to connect the tongue assembly 90 with the buckle in a force-transmitting relationship.

The latch plate 92 also has a secondary latch portion 98. The secondary latch portion 98 projects from the base portion 94 at a location spaced apart from the primary latch portion 96. The secondary latch portion 98 extends parallel to the primary latch portion 96. A hook 100 extends from an outer end portion 102 of the secondary latch portion 98, in a direction toward the primary latch portion 96.

The tongue assembly 90 also includes a second conduit 110. The second conduit 110 forms a part of the inflation mechanism 10. The second conduit 110 is fixed in position on the secondary latch portion 98 of the latch plate 92 by screws 111.

The second conduit 110 has a tubular, cylindrical configuration, similar to that of the first conduit 70, including outer and inner end portions 112 and 114, respectively. The outer end portion 112 of the second conduit 110 is connected in fluid communication with the inflatable seat belt portion, as shown schematically in FIG. 2, by a flexible member 116.

The inner end portion 114 of the second conduit 110 is open to receive the first conduit 70. When the tongue assembly 90 is engaged with the buckle 20 as described below, the second conduit 110 is coaxial with the first conduit 70. The inner diameter of the second conduit 110 is selected to receive the outer end portion 78 of the first conduit 70, including the burst disk 82, in sealing sliding engagement. The elastomeric coating helps the burst disk 82 to form a seal with the inner diameter of the second conduit 110.

Figure 3:
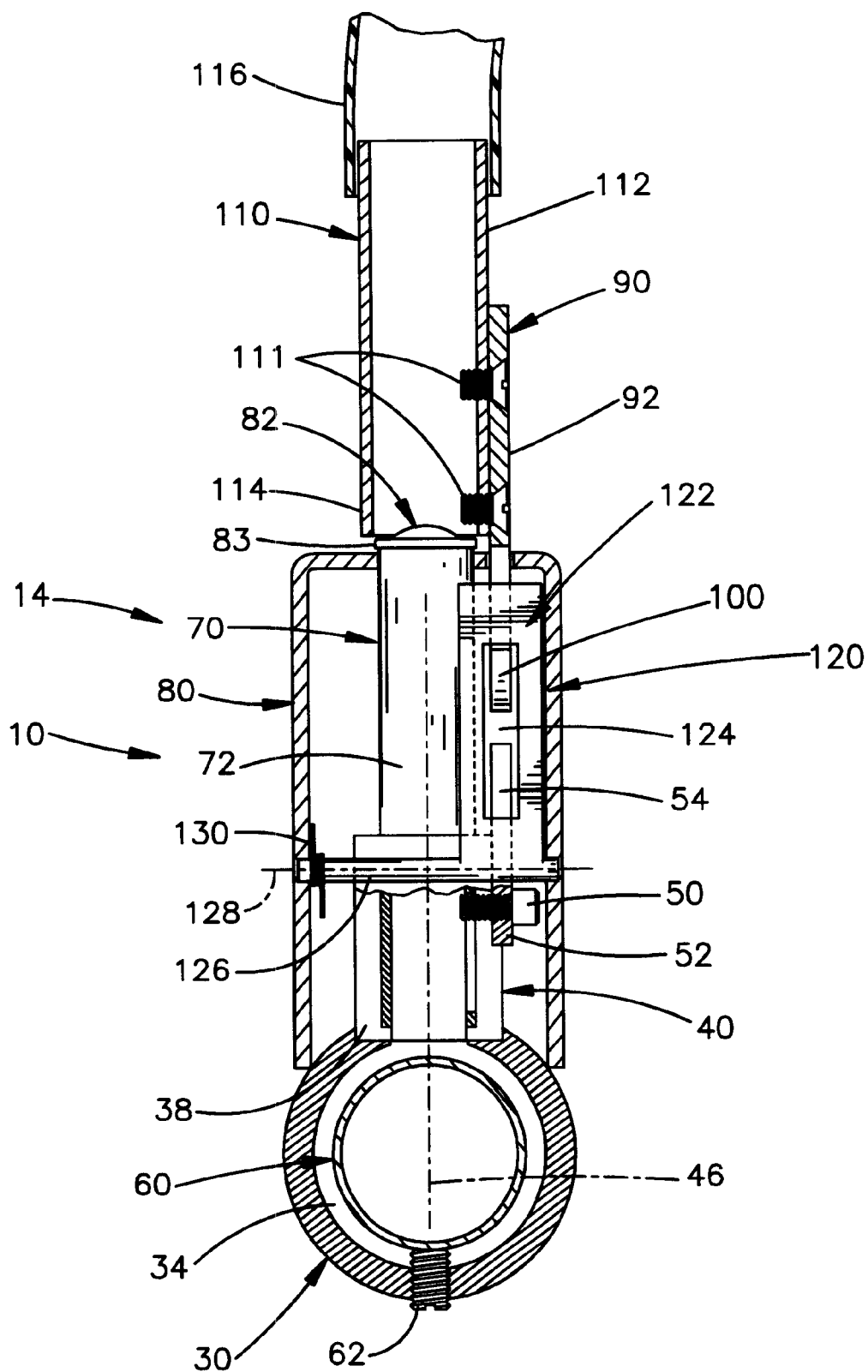
FIG. 3 is a sectional view taken generally along line 3—3 of FIG. 2.
Figure 4:
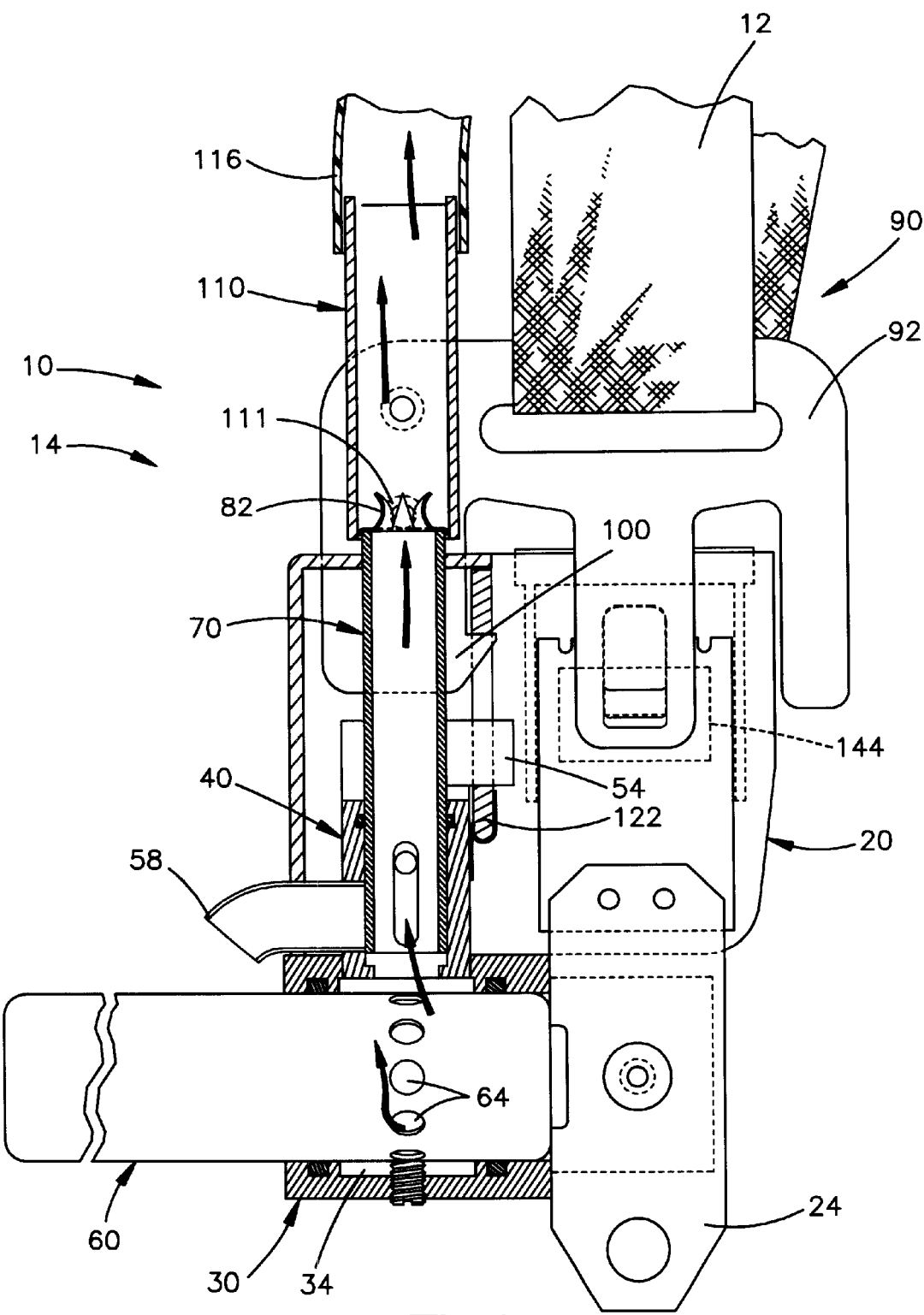
FIG. 4 is a view similar to FIG. 2, showing the inflation mechanism in an actuated condition.

The inflation mechanism 10 includes a secondary latch mechanism 120 (FIGS. 3 and 4). The secondary latch mechanism 120 includes the locking flange 52 on the manifold 30 and the hook 100 on the tongue assembly latch plate 92. The secondary latch mechanism 120 also includes a secondary latch member 122. The secondary latch member 122 is a rectangular plate having an elongate central opening or slot 124. The opening 124 is long enough to receive both the hook 100 on the latch plate 92 of the tongue assembly 90 and the locking flange 54 on the manifold 30, in a side-by-side relationship as shown in FIG. 3.

The secondary latch member 122 (FIG. 2) has at one end a pivot pin 126. The pivot pin 126 supports the secondary latch member 122 on the housing 80 for pivotal movement relative to the housing about an axis 128.

A first torsion spring 130 biases the secondary latch member 122 into an upright position (parallel to the longitudinal extent of the cylinder 40). A second torsion spring 132 extends outward from the secondary latch member 122. The second torsion spring 132 is engageable by the push-button 28 of the buckle 20 to help effect disengagement of the buckle from the tongue assembly 90, as described below.

The inflation mechanism 10 also includes vehicle electric circuitry indicated schematically at 140 for controlling the operation of the inflator 60. The vehicle electric circuitry 140 includes a power source, which is preferably the vehicle battery and/or a capacitor, and a normally open switch. The switch is part of a collision sensor that senses a condition indicating the occurrence of a vehicle collision. The collision-indicating condition may comprise, for example, sudden vehicle deceleration caused by a collision.

The vehicle electric circuitry 140 further includes a controller 142, and a buckle switch shown schematically at 144. The buckle switch 144 is a known device that generates a control signal indicative of the buckled or unbuckled condition of the seat belt system 14.

The controller 142 preferably includes one or more microprocessors for controlling operation of the inflation mechanism 10. The controller 142 may, for example, be a plurality of discrete components and/or a combination of discrete components and integrated circuits. In one example, the controller 142 is a microcomputer, which receives sensory input from one or more sources, such as occupant condition sensors and vehicle condition sensors including the buckle switch 144. Using the sensory input, the microcomputer makes determinations for control of the inflation mechanism 10.

If a collision-indicating condition sensed by the collision sensor is above a predetermined threshold, it indicates the occurrence of a collision for which inflation of the seat belt portion 12 is desired to help protect an occupant of the vehicle. The controller 142 checks the state of the signal from the buckle switch 144. If the buckle switch 144 indicates that the seat belt system 14 is in a buckled condition, the controller 142 transmits an actuation signal to the inflator 60 via lead wires 146. When the inflator 60 is actuated, it emits inflation fluid under pressure into the inflator chamber 34 in the manifold 30. The manifold 30 directs the inflation fluid from the inflator 60 through the opening 36 into the cylinder 40 and thence into the first conduit 70.

The fluid pressure inside the first conduit 70 builds until the first conduit starts to slide along the cylinder 40 in a direction away from the inflator 60 and toward the second conduit 110. The cylinder 40 constrains the first conduit 70 to move in a direction such that the outer end portion 78 of the first conduit moves into the open inner end portion 114 of the second conduit 110. The radially projecting portion 83 of the burst disk 82 moves into sealing engagement with the inner end portion 114 of the second conduit 110.

When the first conduit 70 moves far enough into the second conduit 110, the outer end portion 78 of the first conduit contacts the head of the screw 111. The engagement of the first conduit 70 with the screw 111 blocks further movement of the first conduit 70 in the cylinder 40. Because the first conduit 70 ceases to move away from the inflator 60, and the inflator is still emitting inflation fluid, the pressure inside the first conduit increases to a point at which the burst disk 82 ruptures as shown in FIG. 4.

When the burst disk 82 ruptures, the fluid in the first conduit 70 is free to flow into the second conduit 110. The fluid in the first conduit 70, and the remaining fluid from the inflator 60, flow through the second conduit 110 and into the inflatable seat belt portion 12 to inflate it. Inflating the inflatable seat belt portion 12 can help to protect the vehicle occupant.

When the inflation mechanism 10 is actuated, the inflation fluid flowing into the first and second conduits 70 and 110 exerts a substantial amount of force in a direction tending to pull the tongue assembly 90 out of the buckle 20. This force is resisted by the secondary latch mechanism 120, as follows.

The secondary latch mechanism 120 is engaged automatically when the tongue assembly 90 is engaged with the buckle 20. Specifically, when the tongue assembly 90 begins to move into engagement with the buckle 20, the hook 100 on the tongue assembly engages the secondary latch member 122 and causes it to pivot into the unlatched condition shown in dot-dash lines in FIGS. 1 and 2. When the tongue assembly 90 moves farther into engagement with the buckle 20, the secondary latch member 122, under the influence of the first spring 130, pivots back to the latched condition shown in solid lines in FIGS. 1 and 2. In this condition, both the hook 100 on the tongue assembly latch plate 92, and the locking flange portion 54 on the manifold 30, are received in the slot 124 in the secondary latch member 122.

Thereafter, any outwardly directed force (upward as viewed in FIGS. 1–5) on the tongue assembly 90 is transmitted through the hook 100 of the tongue assembly latch plate 92 into the secondary latch assembly 122. This force is transmitted from the secondary latch member 122 into the end portion 54 of the locking flange 52 of the manifold 30. Because the locking flange 52 is rigidly secured through the manifold with the anchor plate 24, the outwardly directed force on the tongue assembly 90 is transmitted into the vehicle body, thus blocking movement of the tongue assembly away from the buckle 20. The force does not pass through the pivot pin 126 of the secondary latch member.

The secondary latch mechanism 120 must be disengaged in order to disengage the tongue assembly 90 from the buckle 20. To effect this disengagement, the vehicle occupant applies force to the pushbutton 28 in the downward direction as viewed in FIG. 5. The pushbutton 28 engages the second spring 132. The second spring 132 pivots the secondary latch member 122 from the latched condition shown in solid lines in FIG. 5 to the unlatched condition shown in dot-dash lines in FIG. 5. The tongue assembly 90 can then be disengaged from the buckle 20.

The inflator 60 is not normally actuated unless the seat belt system 14 is in a buckled condition, that is, unless the tongue assembly 90 is connected with the buckle assembly 20. It is conceivable that a failure in the buckle switch 144 or controller 142 could cause the controller to indicate erroneously that the seat belt system 14 is in a buckled condition. In that case, the inflator 60 would, undesirably, be actuated by the controller 142.

Figure 5:
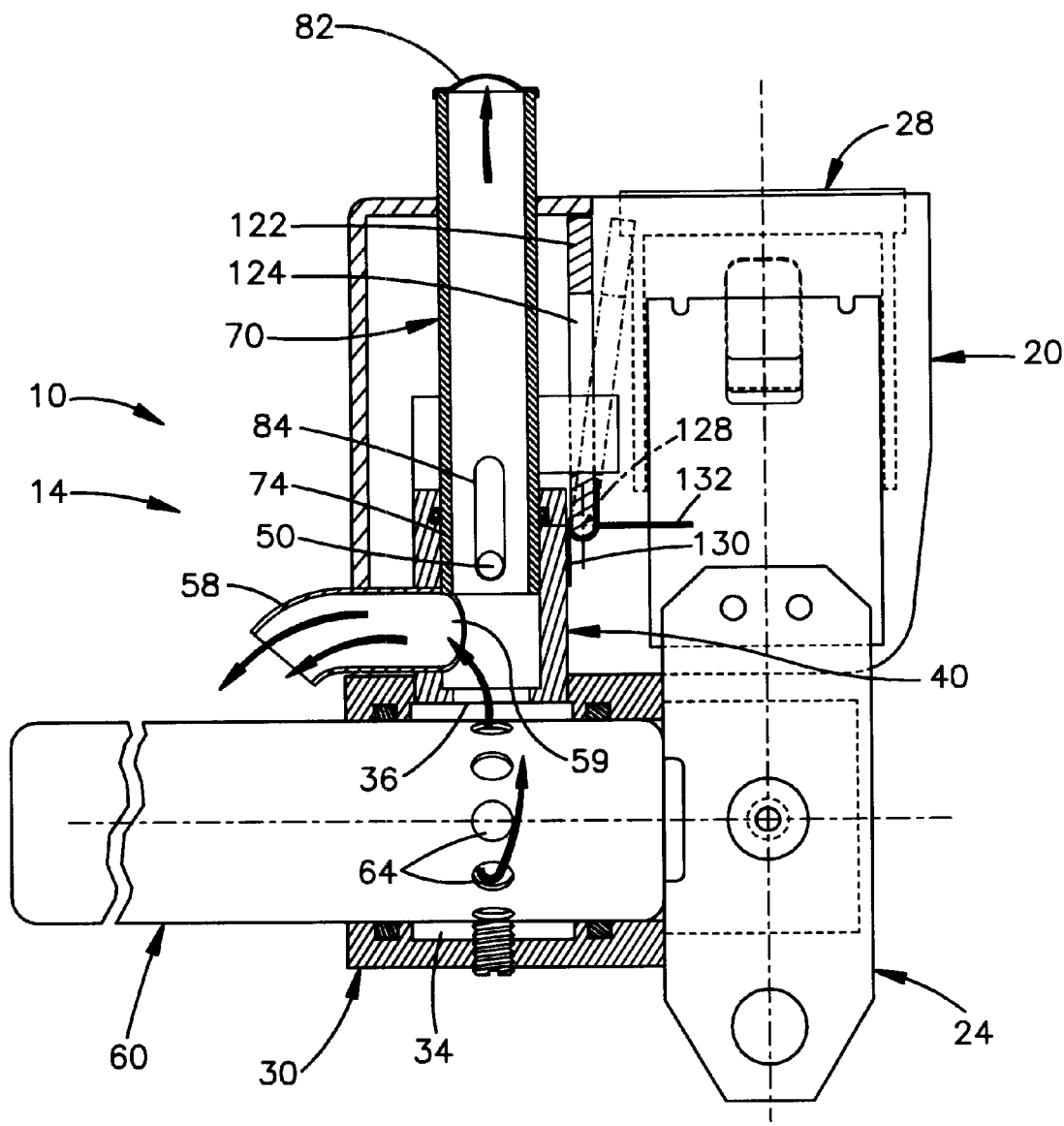
FIG. 5 is a view of a portion of the inflation mechanism shown in a venting condition.

Should this occur, inflation fluid from the inflator 60 would cause the first conduit 70 to move in the cylinder 40 away from the inflator. Because the second conduit 110 would not be located adjacent the first conduit 70, the movement of the first conduit would not be stopped by the screw 111 on the tongue assembly 90. Instead, the first conduit 70 would move in the cylinder until the stop screw 50 bottomed out in the lower end of the slot 84, as shown in FIG. 5. This engagement would stop the sliding movement of the first conduit 70 in the cylinder 40, with the parts in the position shown in FIG. 5.

In this condition, the inner end portion 74 of the first conduit 70 would be adjacent to, or have moved just past, the vent opening 59 in the cylinder wall 42. As a result, inflation fluid from the inflator chamber 34 and from the first conduit 70 would flow out of the vent opening 59 into the vent tube 58. The inflation fluid would be exhausted through the vent tube 58 to atmosphere, away from the occupants, rather than building up in the first conduit 70 to a level sufficient to rupture the burst disk 82.

From the above description of the invention, those skilled in the art will perceive improvements, changes and modifications in the invention. Such improvements, changes and modifications within the skill of the art are intended to be covered by the appended claims.

Having described the invention, I claim:

1. An apparatus for helping to protect a vehicle occupant, comprising:

a vehicle seat belt system including a buckle, a tongue assembly, and an inflatable seat belt portion connected with said tongue assembly, said buckle and said tongue assembly having a buckled condition and an unbuckled condition;

an inflation mechanism connected with said buckle, including an actuatable inflator and a first conduit in fluid communication with said inflator;

a second conduit in fluid communication with said inflatable seat belt portion;

said first conduit having a rupturable portion blocking fluid flow out of said first conduit toward said second conduit;

said first conduit, upon actuation of said inflator when said buckle and said tongue assembly are in the buckled condition, moving from a first position in which said first conduit is not in fluid communication with said second conduit to a second position in which said first conduit is in fluid communication with said second conduit and said rupturable portion thereafter is ruptured to enable fluid flow from said first conduit to said second conduit to inflate said inflatable seat belt portion.

2. An apparatus as set forth in claim 1 wherein said first conduit has an end portion that moves into said second conduit when said first conduit moves to the second position to establish fluid communication with said second conduit.

3. An apparatus as set forth in claim 2 wherein said rupturable portion of said first conduit is located on said end portion of said first conduit.

4. An apparatus as set forth in claim 1 wherein said first conduit and said second conduit have coaxial portions that engage when said first conduit moves from the first position to the second position to establish fluid communication between said first conduit and said second conduit.

5. An apparatus as set forth in claim 1 wherein said rupturable portion closes a first end portion of said first conduit, said inflation mechanism including a manifold for directing inflation fluid into said first conduit and into engagement with said rupturable portion to cause said first conduit including said rupturable portion to slide into said second position in fluid communication with said second conduit.

6. An apparatus as set forth in claim 1 including means for venting inflation fluid from said first conduit upon actuation of said inflator when said buckle is not connected with said tongue assembly, to prevent inflation fluid from flowing through said second conduit into said inflatable seat belt portion.

7. An apparatus as set forth in claim 1 including a secondary latch mechanism to help resist movement of said tongue assembly away from said buckle when said seat belt system is in a buckled condition and upon actuation of said inflator.

8. An apparatus for helping to protect a vehicle occupant, comprising:

a vehicle seat belt system including a buckle and a tongue assembly, said buckle and said tongue assembly having a buckled condition and an unbuckled condition, said seat belt system also including an inflatable seat belt portion;

an actuatable inflator;

a conduit for directing inflation fluid from said inflator to said inflatable seat belt portion to inflate said inflatable seat belt portion;

a sensor for indicating whether said buckle and said tongue assembly are in the buckled condition or the unbuckled condition;

means responsive to said sensor for selectively directing inflation fluid from said inflator through said conduit into said inflatable seat belt portion when said buckle and said tongue assembly are in the buckled condition, to help protect the vehicle occupant; and a vent for venting inflation fluid from said conduit upon actuation of said inflator when said buckle and said tongue assembly are in the unbuckled condition, to help prevent inflation fluid from flowing through said conduit into the vehicle occupant compartment in a direction toward the vehicle occupant.

9. An apparatus as set forth in claim 8 comprising a cylinder receiving said conduit for sliding movement and a vent opening in said cylinder.

10. An apparatus as set forth in claim 8 wherein said conduit is movable from a first position when said inflator is unactuated to a second position for directing inflation fluid from said inflator through said conduit into said inflatable seat belt portion.

11. An apparatus as set forth in claim 10 wherein said conduit is movable from the first position to a third position to enable venting of inflation fluid from said conduit.

12. An apparatus as set forth in claim 8 wherein said conduit has a first end portion closed by a rupturable portion of said first conduit, and a second end portion movable past a vent opening to enable venting of inflation fluid from said conduit.

13. An apparatus as set forth in claim 8 including a secondary latch mechanism to help resist movement of said tongue assembly away from said buckle when said seat belt system is in a buckled condition and said inflator is actuated.

14. An apparatus for helping to protect a vehicle occupant, comprising:

a vehicle seat belt system including a tongue assembly and a buckle, said tongue assembly and said buckle having a buckled condition in which a first latch part on said tongue assembly is engaged with a second latch part on said buckle to resist movement of said tongue assembly away from said buckle;

an inflatable seat belt portion connected with said tongue assembly;

an inflation mechanism connected with said buckle, including an actuatable inflator;

a conduit for directing inflation fluid from said inflator to said inflatable seat belt portion to inflate said inflatable seat belt portion; and a third latch part on said tongue assembly engageable with a fourth latch part on said inflation mechanism to help resist movement of said tongue assembly away from said buckle when said seat belt system is in the buckled condition and said inflator is actuated.

15. An apparatus as set forth in claim 14 wherein said fourth latch part on said inflation mechanism is movable between engaged and disengaged positions upon engagement of said tongue assembly with said buckle.

16. An apparatus as set forth in claim 15 wherein said fourth latch part has an opening for receiving said third latch part and for receiving when in the engaged position a fixed portion of said inflator mechanism.

17. An apparatus as set forth in claim 14 wherein said third latch part is a hook on said tongue assembly and said fourth latch part is a latch plate having an opening, said hook being received in said opening to help resist movement of said tongue assembly away from said buckle when said seat belt system is in the buckled condition and said inflator is actuated.

18. An apparatus as set forth in claim 14 wherein said conduit is movable from a first position when said inflator is unactuated to a second position for directing inflation fluid from said inflator through said conduit into said inflatable seat belt portion.

19. An apparatus as set forth in claim 14 including means for venting inflation fluid from said conduit upon actuation of said inflator when said buckle is not connected with said tongue assembly, to prevent inflation fluid from flowing through said conduit into the vehicle occupant compartment in a direction toward the vehicle occupant.

* * * * *